United States Patent Office 3,011,054
Patented Nov. 28, 1961

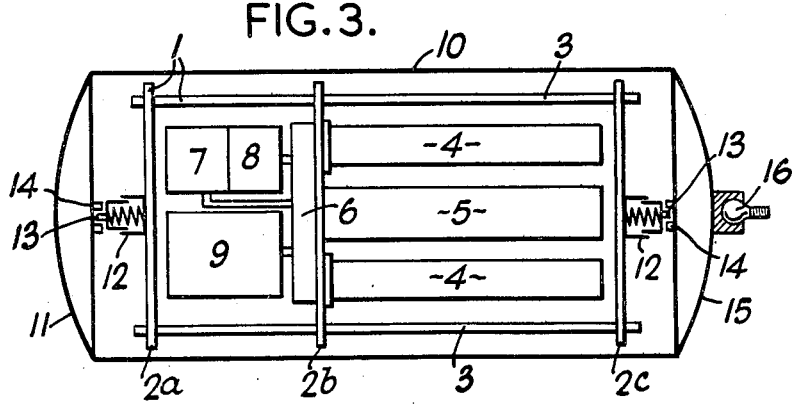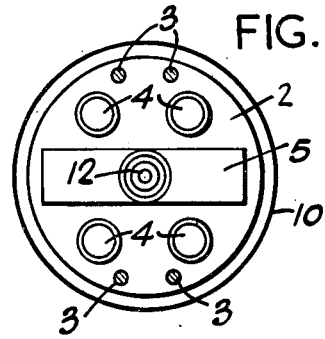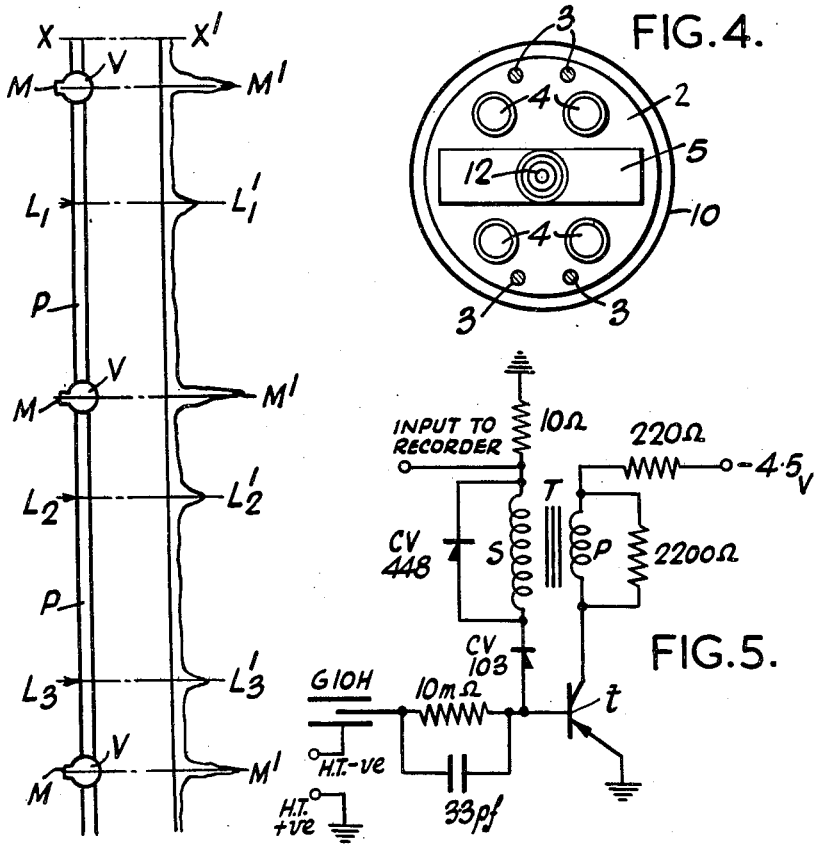

3,011,054
METHOD AND APPARATUS FOR THE DETECTION OF LEAKS IN PIPE LINES
Sidney Jefferson, Abingdon, and John Foster Cameron, Harwell, England, assignors, by mesne assignments, to the United States of America as represented by the United States Atomic Energy Commission
Filed Sept. 23, 1955, Ser. No. 536,168
Claims priority, application Great Britain Sept. 23, 1954
4 Claims. (Cl. 250—43.5)

This invention relates to a method and apparatus for detecting leaks in buried or otherwise inaccessible pipe lines.

One method which has been used for detecting leaks at the joints in water mains is to fill a length of the main with a radioactive solution under pressure and, after flushing out with water, placing a detector of radioactivity in a bore hole in the ground adjacent each joint so as to detect the presence of any radioactive solution which may have escaped into the ground in the region of the joint. Such a method is, however, laborious and becomes impractical for pipe lines many miles in length.

A method of detecting leaks in pipe lines in accordance with the present invention comprises the steps of injecting a radioactive solution into fluid flowing in the line, introducing a squeegee go-devil into the line behind the radioactive solution, introducing a radioactivity recording detector mounted in, or associated with, a further squeegee go-devil, into the line after an interval sufficient to enable the non-radioactive solution between the squeegees to flush the inside of the line clear of radioactivity, recovering the recording detector at a remote point, and transcribing the record of any activity outside the pipe line in terms of distance along the line.

If a constant flow velocity can be assured the recorder may be arranged to operate at a constant speed and transcription may then be effected simply by relating time intervals on the record to distance along the line.

It is preferred, however, not to rely on a constant flow velocity but to provide means for marking the record at intervals corresponding to points along the line, for example, by arranging sources of radioactivity at intervals along the line which will make a characteristic signal on the record or by providing in microphone arranged to feed a signal to the record each time a joint is traversed.

Apparatus in accordance with the invention for use in detecting leaks in pipe lines comprises a container adapted to be propelled through a pipe line by fluid in the line, and mounted within the container, a detector of radioactivity, means for recording the output of said detector and a source or sources of power for said detector and recording means. An amplifier may be associated with the detector as necessary.

For most purposes of the invention gamma radioactivity, capable of penetrating a thick metal pipe, is necessary and the detector may comprise one or more Geiger counters or scintillation detectors.

The recorder is conveniently of the magnetic wire or tape variety and the pulse signals from the detector may either be recorded as such or may be integrated to provide a record of the pulse rate. When a scintillation detector is used the mean current taken by the photomultiplier associated with the detector provides a measure of the pulse rate.

The power source for the detector and amplifier may be a battery or a motor generator set. The motor of the latter may be clockwork or a compressed air motor operated from an air cylinder or a hydraulic motor operated by the fluid in the pipe line.

The recorder may be driven by an electric motor deriving power from the same source as the detector or it may be driven mechanically from the motor of the motor-generator set, if one is employed, or by a separate motor.

If marker devices are not provided along the pipe line, and the go-devil can be expected to travel with constant velocity, then some accurate form of constant speed control is required for the recorder drive.

The invention will be more readily understood if reference is made to the accompanying drawing in which:

FIG. 1 is a plan of a pipe line such as might be examined by the method of the invention.

FIG. 2 shows a trace such as might be obtained on transcribing a record, obtained by the leak detector, by means of a pen and paper recorder.

FIG. 3 is a diagrammatic side elevation of one practical form of leak detector in accordance with the invention.

FIG. 4 is a diagrammatic and elevation of FIG. 3.

FIG. 5 is a circuit diagram of a transistor pulse-lengthening circuit used in the leak detector shown in FIGS. 3 and 4.

Leaks are detected in a pipe line, by a method of the invention, as follows. Assuming, by way of example, that water is the fluid flowing in the line, a brine solution is first injected into the line at some suitable point such as an inlet valve. Meanwhile a radioactive solution has been made up in a container attached to the inlet valve by a tube. A suitable radioactive solution may be made by dissolving pellets of radioactive sodium bicarbonate in hot 10% acetic acid (the sodium bicarbonate contains the isotope $Na_{24}$ and is of 1 curie in strength). The radioactive solution is then allowed to run into the pipe line from the container. In the pipe line the radioactive solution mixes with the brine just previously injected into the line. A squeegee go-devil is then inserted into the pipe line at a go-devil hatch situated at some point upstream from the point at which the radioactive solution was injected into the pipe line. This squeegee go-devil is allowed to travel along the pipe line under the action of the flowing liquid. After a period of time, which may be about half an hour a second squeegee go-devil is introduced into the pipe line at the go-devil hatch. This secnd squeegee go-devil carries a radioactivity recording etector (the construction of which is described later). ᴛhe liquid between the squeegee go-devil which was first inserted in the pipe line and the second squeegee go-devil is virtually non-radioactive and flushes the inside of the ˡine clear of radioactivity. If there are any leakage oints in the pipe line the radioactive solution which is swept along in front of the first squeegee go-devil will form part of the leakage to the outside of the pipe line.

Thus although the radioactive solution which is left behind in the pipe line by the first squeegee is flushed away by the non-radioactive liquid following this first squeegee the radioactive solution which has leaked to the outside of the pipe line is not flushed away. The radioactive solution left at the leakage points provides a signal which is detected and recorded on the radioactivity detector recorder which is carried by the second squeegee go-devil. The radioactivity detector recorder carried by the second squeegee go-devil contains Geiger counters and the pulses which are produced by the Geiger counters when the detector passes a point of leakage at which there is some radioactive solution, are recorded on a magnetic wire or tape recorder. When the section of the pipe line which it is required to examine has been traversed by the squeegee go-devils, the go-devils are removed from the pipe line and the recording obtained by the radioactivity detector recorder is transcribed by connecting the output of the recorder through a ratemeter to a pen recorder. FIG. 2 shows the sort of trace which might be obtained on examination of a length of pipe line such as is shown in FIG. 1. In FIG. 1 leaks are assumed to exist at $L_1$, $L_2$, $L_3$ along the pipe line P. In FIG. 2 the point $X^1$ on the trace is equivalent to the point X in the pipe line P where the examination began. The peaks $L_1^1$, $L_2^1$, $L_3^1$ in the trace of FIG. 2 are produced on the record by the radioactive solution at the leakage points $L_1$, $L_2$, $L_3$ respectively. If the magnetic recorder in the radioactivity detector recorder can be made to run at a constant speed the distances of the peaks $L_1^1$, $L_2^1$, $L_3^1$ from the point $X^1$ on the record of FIG. 2 are proportional to the distances of the leaks $L_1$, $L_2$, $L_3$ from the point X respectively in the pipe line P of FIG. 1. However, a preferred method of determining the position of the leaks in the pipe line P from a record such as FIG. 2 is to provide marker sources at points on the pipe line at suitable intervals. Suitable points for placing these marker sources are provided by valves V normally to be found at intervals along the pipe line. A suitable marker source is one of $Co_{60}$, 100–200 microcuries in strength held in containers which can be hung on the valves. These marker sources M hung on the valves V (FIG. 1) produce the peaks $M^1$ in the record (FIG. 2). These peaks are higher than the peaks obtained when a leak is detected and the position of the leaks in the pipe line can be related to the position of the valves V in the pipe line P by relating the positions of the peaks in the trace which are due to the leaks to those peaks which are due to the marker sources on the valves.

FIGS. 3 and 4 illustrate the radioactivity detector recorder which is carried by the second squeegee go-devil. The detector recorder comprises a framework 1 constructed from three circular aluminium plates 2a, 2b, 2c joined together in parallel relationship by threaded rods 3. The framework 1 carries four Geiger counter tubes 4 which are mounted parallel to each other on the centre framework plate 2b so that they occupy part of the space between the parallel framework plates 2b and 2c. Also mounted in this space is a miniature wire recorder 5.

A suitable recorder is the "Minifon" made by Protona G.m.b.H. of Hanover, which is modified for long playing by providing a bigger wire spool and making it slower running. The electronic circuitry for the Geiger counters 4 is mounted on the opposite side of the framework plate 2b to the Geiger counters 4 and the pulses which are obtained from the Geiger counter circuit are passed to a transistor pulse lengthening circuit 6 also mounted on the opposite side of the framework plate 2b to the Geiger counters 4. The pulses from the transistor circuit 6 are fed to the wire recorder 5 where they are recorded. A 12 volt battery 7 for the motor of the recorder, a 3 volt battery 8 for the transistor circuit, and a 300 volt high tension battery 9 are mounted in the space between the framework plates 2a and 2b. The whole detector recorder is mounted inside a stainless steel pressure cylinder 10 with domed ends 11. The mounting means comprise spring shock absorbers 12 fitted at each end of the framework 1. Each shock absorber 12 has a pin 13 which locates in sockets 14 in each end of the pressure cylinder 10. The end 15 of the pressure cylinder 10 is detachable and forms a removable lid, removal of which enables the recorder to be extracted from the pressure cylinder 10. The end 15 also has a swivel bolt 16 by which means the recorder can be attached to the go-devil. When the recorder is required to be used in a method of the invention it is fitted into the stainless steel pressure cylinder 10. The wire recorder is switched on and the end 15 of the pressure cylinder 10 is clamped into place. The cylinder 10 is then attached to a squeegee go-devil by means of the swivel bolt 16 and the go-devil with its associated recorder is inserted into the pipe line through which it is propelled by the flowing liquid and any leaks are duly recorded. In the circuit diagram of FIG. 5, which illustrates the transistor pulse lengthening circuit used in the radioactivity detector recorder, pulses from the Geiger tube circuit, comprising Geiger tube G10H, resistance 10 mΩ, and condenser 33 pf., are fed to the base electrode of a p-n-p junction type transistor $t$. The emitter electrode of the transistor $t$ is connected to earth and the collector electrode is connected to a potential of −4.5 volts through the primary winding P of a transformer T. The input to the wire recorder is made from the base electrode of the transistor $t$ through the secondary winding S of the transformer T. In the operation of the circuit, in the absence of a pulse from the Geiger counter the transistor $t$ is shut-off. The circuit is stable in this shut-off condition due to the high value of the emitter resistance at low emitter currents. When a negative-going pulse is received at the base electrode of the transistor $t$ the transistor $t$ is turned on by the pulse. A current therefore starts to flow from the collector electrode through the primary winding P of the transformer T and a current is induced in the secondary winding S in such a sense to maintain the turned on condition i.e. the current induced in S is fed back to the transistor. Therefore the current in the primary and secondary windings rises very rapidly to a maximum value and produces a pulse of current in the secondary winding S which is fed to the recorder. This pulse is considerably longer than the input pulse from the Geiger counter. A rectifier CV 448 is connected in parallel with the secondary winding S to prevent continuous oscillation in the inductive feedback loop. The pulse lengthening circuit of FIG. 5 is necessary in the radioactivity detector recorder as the miniature wire recorder used cannot deal with such short length pulses as are produced by the Geiger counters of the detector recorder.

We claim:

1. A method of detecting leaks in pipe lines carrying fluid comprising the steps of injecting a radioactive solution into a fluid flowing in the line; flushing the line clear of the radioactive solution; introducing a detector-recorder unit, comprising a radioactivity radiation detector and a recorder which records the detector signal over a time period at a substantially constant speed, into the line in association with a go-devil capable of propelling the detector-recorder unit through the line in the direction of the fluid flow at a substantially constant velocity; placing a series of sources of radioactivity at predetermined distances along the downstream part of the line to make a characteristic signal on the recorder record at intervals corresponding to the location of said sources; recovering the detector-recorder unit at a downstream point along the line; transcribing the recorder record of any radioactivity detected during the travel of the detector-recorder unit in terms of distance along the line.

2. A method of detecting leaks as claimed in claim 1, wherein the step of transcribing the record comprises reproducing the detector-recorder signal output over the given period along a base line representing distance.

3. A method of detecting leaks as claimed in claim 1, wherein the step of transcribing the record comprises connecting the output of the recorder through a ratemeter to a pen recorder.

4. A method of detecting leaks in pipe lines carrying fluid comprising the steps of injecting a radioactive solution into a fluid flowing in the line; flushing the line clear of the radioactive solution; introducing a detector-recorder unit, comprising a radioactivity radiation detector and a recorder which records the detector output with respect to time at a substantially constant speed, into the line in association with a go-devil so that the detector-recorder unit is carried down the line at a substantially constant velocity due to the action of the fluid which travels at a substantially constant velocity on the go-devil; placing a series of sources of radioactivity at predetermined distances along the downstream part of the line to make a characteristic signal on the recorder record at intervals corresponding to the location of said sources; recovering the detector-recorder unit at a downstream point along the line; transcribing the recorder record of any radioactivity detected during the travel of the detector-recorder unit in terms of distance along the line.

References Cited in the file of this patent

UNITED STATES PATENTS

| | | |
|---|---|---|
| 1,662,429 | Lowy | Mar. 13, 1928 |
| 2,346,043 | Mysels | Apr. 4, 1944 |
| 2,346,481 | Garrison | Apr. 11, 1944 |
| 2,371,628 | Krasnow | Mar. 20, 1945 |
| 2,401,723 | Deming | June 11, 1946 |
| 2,588,210 | Crisman | Mar. 4, 1952 |
| 2,601,248 | Brenholdt | June 24, 1952 |
| 2,737,595 | Scherbatskoy | Mar. 6, 1956 |